United States Patent
Ziemer et al.

(10) Patent No.: US 10,955,031 B2
(45) Date of Patent: Mar. 23, 2021

(54) MULTISPEED TRANSMISSION

(71) Applicant: ZF Friedrichshafen AG, Friedrichshafen (DE)

(72) Inventors: Peter Ziemer, Tettnang (DE); Kai Bornträger, Langenargen (DE); Christoph Margraf, Markdorf (DE); Andreas Beisswenger, Friedrichshafen (DE); Stefan Brom, Canton, OH (US)

(73) Assignee: ZF FRIEDRICHSHAFEN AG, Friedrichsh Afen (DE)

( * ) Notice: Subject to any disclaimer, the term of this patent is extended or adjusted under 35 U.S.C. 154(b) by 0 days.

(21) Appl. No.: 16/348,524

(22) PCT Filed: Oct. 24, 2017

(86) PCT No.: PCT/EP2017/077061
§ 371 (c)(1),
(2) Date: May 9, 2019

(87) PCT Pub. No.: WO2018/086858
PCT Pub. Date: May 17, 2018

(65) Prior Publication Data
US 2020/0056680 A1    Feb. 20, 2020

(30) Foreign Application Priority Data

Nov. 11, 2016    (DE) .................... 10 2016 222 228.7

(51) Int. Cl.
*F16H 3/66*    (2006.01)
*B60K 6/48*    (2007.10)

(52) U.S. Cl.
CPC ............... *F16H 3/66* (2013.01); *B60K 6/48* (2013.01); *B60K 2006/4825* (2013.01);
(Continued)

(58) Field of Classification Search
CPC .............. F16H 3/66; F16H 2200/0026; F16H 2200/0078; F16H 2200/2015; F16H 2200/2046
(Continued)

(56) References Cited

U.S. PATENT DOCUMENTS 6,634,980 B1    10/2003    Ziemer
6,960,149 B2    11/2005    Ziemer
(Continued)

FOREIGN PATENT DOCUMENTS

DE          199 49 507 A1    4/2001
DE    10 2011 056 897 A1    3/2013
(Continued)

OTHER PUBLICATIONS

German Search Report Corresponding to 10 2016 222 228.7 dated May 8, 2017.
(Continued)

*Primary Examiner* — Roger L Pang
(74) *Attorney, Agent, or Firm* — Davis & Bujold PLLC; Michael J. Bujold

(57) ABSTRACT

A multi-speed transmission having drive and output shafts, front-mounted planetary gearsets, rear-mounted planetary gearsets and six shift elements. Selective engagement of shift elements selectively renders a drive shaft speed and speeds generated in the front gearsets for achieving a reverse gear and twelve forward gears via the rear gearsets transmissible as an output speed to the output shaft. Four shift elements are assigned to the front gearsets and two are assigned to the rear gearsets. At least one front gearset is rigidly connected to an element of the rear gearsets, resulting in six different output speeds of the front gearsets being transmissible to the rear gearsets. If normalized to the drive shaft input speed, one output speed is smaller than 0, three output speeds are between 0 and 1, one output speed is equal to 1 and one output speed is greater than 1.

12 Claims, 2 Drawing Sheets

(52) U.S. Cl.
CPC ............... *F16H 2200/0026* (2013.01); *F16H 2200/0078* (2013.01); *F16H 2200/2015* (2013.01); *F16H 2200/2046* (2013.01)

(58) Field of Classification Search
USPC .......................................... 475/275–292, 330
See application file for complete search history.

(56) References Cited

U.S. PATENT DOCUMENTS

| | | | |
|---|---|---|---|
| 8,517,885 | B2 | 8/2013 | Shim et al. |
| 9,163,705 | B1 | 10/2015 | Hwang et al. |
| 9,217,494 | B2 * | 12/2015 | Hoffman .................. F16H 3/66 |
| 9,822,856 | B2 | 11/2017 | Hoffman |
| 2019/0293153 | A1 * | 9/2019 | Ziemer .................... F16H 3/66 |
| 2020/0079206 | A1 * | 3/2020 | Ziemer .................... B60K 6/48 |

FOREIGN PATENT DOCUMENTS

| | | | | |
|---|---|---|---|---|
| DE | 10 2015 213 067 A1 | 1/2014 | | |
| DE | 10 2014 214 212 A1 | 1/2015 | | |
| DE | 102013225212 A1 * | 6/2015 | ............ | B60K 6/445 |
| DE | 20 2015 004 910 U1 | 9/2015 | | |
| DE | 10 2014 117 679 A1 | 3/2016 | | |
| EP | 1 373 756 B1 | 4/2012 | | |
| JP | 2005-172123 A | 6/2005 | | |
| JP | 2014-224547 A | 12/2014 | | |
| WO | 02/079669 A1 | 10/2002 | | |

OTHER PUBLICATIONS

German Search Report Corresponding to 10 2016 222 226.0 dated May 8, 2017.
German Search Report Corresponding to 10 2016 222 222.8 dated May 8, 2017.
International Search Report Corresponding to PCT/EP2017/077061 dated Jan. 29, 2018.
International Search Report Corresponding to PCT/EP2017/078693 dated Jan. 31, 2018.
International Search Report Corresponding to PCT/EP2017/078708 dated Jan. 29, 2018.
Written Opinion Corresponding to PCT/EP2017/077061 dated Jan. 29, 2018.
Written Opinion Corresponding to PCT/EP2017/078693 dated Jan. 31, 2018.
Written Opinion Corresponding to PCT/EP2017/078708 dated Jan. 29, 2018.

* cited by examiner

| gear | A | B | C | D | E | F | ratio | efficiency | gear step | |
|---|---|---|---|---|---|---|---|---|---|---|
| R |  | o | o |  |  | o | -7.25 | 0.967 | -0.66 R/1. | |
| N |  | o |  |  |  | o | – | – | -1.04 R/2. | |
| G1 | o | o |  |  |  | o | 10.91 | 0.961 | 1.57 | |
| G2 | o |  | o |  |  | o | 6.96 | 0.968 | 1.71 | |
| G3 | o |  |  | o |  | o | 4.06 | 0.981 | 1.40 | |
| G4 |  |  | o | o |  | o | 2.90 | 0.987 | 1.39 | |
| G5 |  | o |  | o |  | o | 2.09 | 0.980 | 1.35 | |
| G6 | (o) | o | (o) | (o) | o | o | 1.54 | 0.988 | 1.30 | |
| G7 |  | o |  | o | o |  | 1.18 | 0.992 | 1.18 | 1.31 |
| G8 |  |  | o | o | o |  | 1.00 | 1.0 | 1.11 | |
| G9 | o |  |  | o | o |  | 0.90 | 0.996 | 1.11 | 1.17 |
| G10 | o |  | o |  | o |  | 0.81 | 0.993 | 1.05 | |
| G11 | o | o |  |  | o |  | 0.77 | 0.993 | 1.21 | |
| G12 |  | o | o |  | o |  | 0.64 | 0.991 | ratio spread 2 - 12 | 10.9 |
| | | | | | | | | | ratio spread 1 - 12 | 17.0 |

In the 6th gear A or C or D could be engaged instead of B, these alternative engagements being shown in parenthesis

MULTISPEED TRANSMISSION

This application is a National Stage completion of PCT/EP2017/077061 filed Oct. 24, 2017, which claims priority from German patent application serial no. 10 2016 222 228.7 filed Nov. 11, 2016.

FIELD OF THE INVENTION

This invention relates to a multi-speed transmission.

BACKGROUND OF THE INVENTION

For instance from document EP 1 373 756 B1, a multi-speed transmission is known as an automatic transmission, in which, for instance, two front-mounted gear sets and two rear-mounted gear sets are provided, to which seven shift elements are assigned, wherein, however, only eleven forward gears and one reverse gear can be achieved. A connecting shaft is used to permanently connect the front-mounted gear sets to the rear-mounted gear sets. Further, the rear-mounted gear sets can be connected to the drive shaft via a shaft and a clutch as a shift element and can be fixed via a further shaft and a brake as a further shift element, such that the two rear-mounted gear sets in at least three of the forward gears simultaneously transfer torque. For that reason, the number of gears is limited in spite of the large number of components required, such as the seven shift elements.

SUMMARY OF THE INVENTION

This invention addresses the problem of providing a multi-speed transmission of the type described above, having a maximum number of gears and a design that is structurally as simple as possible.

According to the invention, this problem is solved by the features of the independent claims, wherein advantageous embodiments are presented in the subclaims, the description and the drawings.

Thus, a multi-speed transmission is proposed as an automatic transmission, in particular for vehicles, which transmission has a drive shaft and an output shaft and a first front-mounted gear set, a second front-mounted gear set and a third front-mounted gear set. Further, a first rear-mounted gear set and a second rear-mounted gear set are provided. The front-mounted gear sets and the rear-mounted gear sets are each designed as planetary gear sets. Moreover, only 6 shift elements are provided in the multi-speed transmission, the selective engaging of which can be used to transmit a drive speed of the drive shaft and speeds generated in the front-mounted gear sets selectively for achieving at least 12 forward gears and at least one reverse gear to the output shaft as output speed via at least one of the rear-mounted gear sets. Four shift elements are assigned to the two front-mounted gear sets and two shift elements are assigned to the two rear-mounted gear sets. At least one of the front-mounted gear sets is rigidly tied to an element of the rear-mounted gear sets such that six different output speeds of the front-mounted gear sets can be transferred to at least one of the rear-mounted gear sets, wherein, if normalized to the input speed of the drive shaft, one of the output speeds is less than 0, three output speeds are between 0 and 1, one output speed is equal to 1 and one output speed is greater than 1.

In this way, a multi-speed transmission is proposed as an automatic transmission, in which at least twelve forward gears and one reverse gear are provided based on a structurally simpler design, wherein in addition one particularly short and one particularly tall forward gear can be implemented, the maximum number of single gear sets being five and the maximum number of shift elements being six. Thus, in contrast to known multi-speed transmissions, additional speeds are implemented and at the same time the number of shift elements is reduced. Consequently, the proposed multi-speed transmission allows for a maximum number of speeds at a structurally simple design and optimized difference between gear ratios.

Preferably, in the multi-speed transmission according to the invention, only three of the shift elements are designed as clutches and three shift elements are designed as brakes. This results in a further advantage where installation space is concerned, as the design of brakes is much simpler than that of clutches.

Because the three front-mounted gear sets are preferably designed as 3-carrier 5-shaft gears and in addition four shift elements are assigned to the front-mounted gear sets, the complexity of the design is further reduced. This is achieved by connecting one element of the first front-mounted gear set to one element of the second front-mounted gear set and connecting another element of the second front-mounted gear set to one element of the third front-mounted gear set and connecting another element of the third front-mounted gear set to one element of the first front-mounted gear set.

For both rear-mounted gear sets, provision is preferably made that these are designed as 2-carrier 4-shaft gears or arrangements. In a 2-carrier 4-shaft gear or arrangement, provision is made that in each case two elements of the two gear sets are connected to each other, resulting in only four shafts being required instead of the customary six shafts. There, shift elements are assigned to the rear-mounted gear sets. As a result, the design of the proposed multi-speed transmission is further simplified and the overall manufacturing costs are further reduced.

This multi-speed transmission according to the invention can generally be used in vehicles. A preferred application can provide that the multi-speed transmission be used in vehicles that require a particularly short first gear or a so-called creep mode, such as in off-road vehicles or in utility vehicles, such as buses or the like. Because a tall gear can also be implemented in the multi-speed transmission, the efficiency of driving is also improved.

BRIEF DESCRIPTION OF THE DRAWINGS

Below, this invention is explained with reference to the drawings. In the figures.

DETAILED DESCRIPTION OF THE PREFERRED EMBODIMENTS

Figure 1:
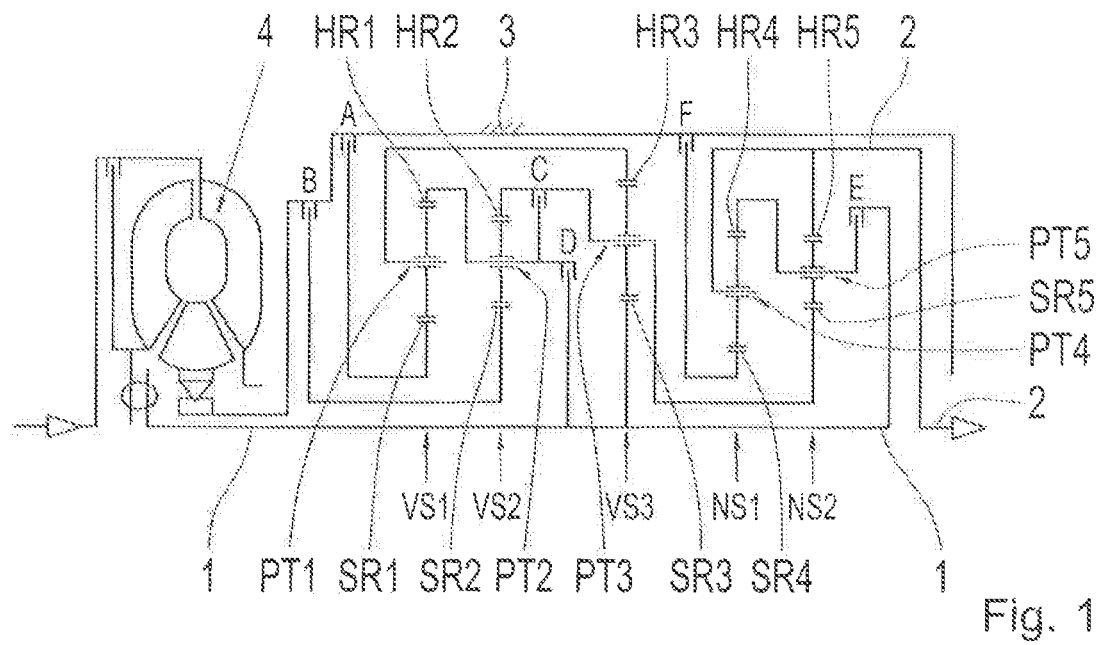
FIG. 1 shows a schematic view of a first embodiment of a multi-speed transmission according to the invention.
Figure 2:
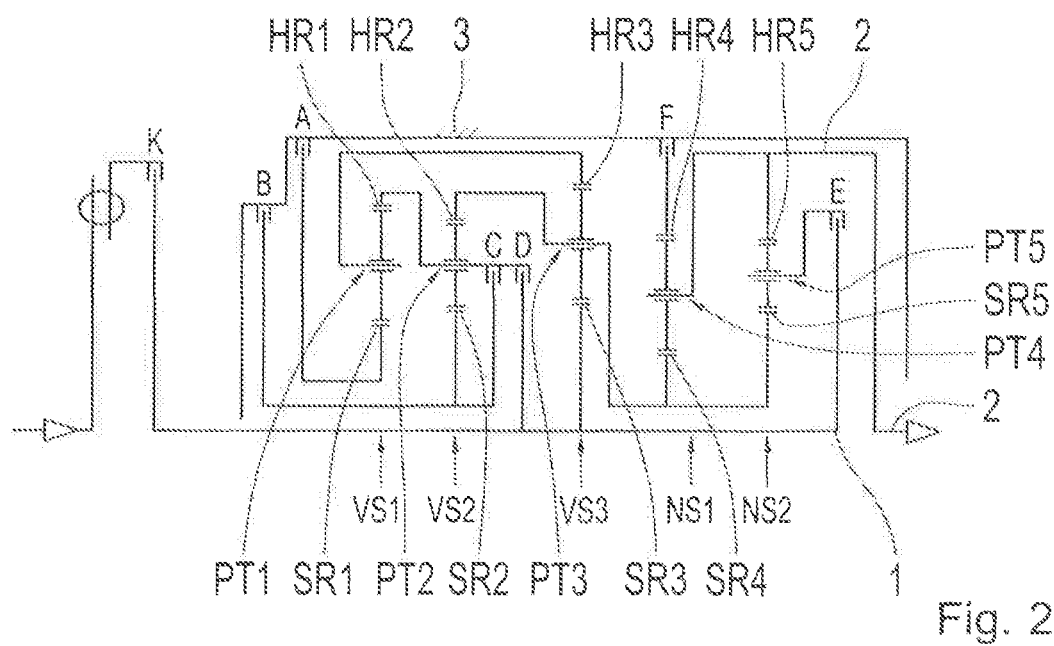
FIG. 2 shows a schematic view of a second embodiment of the multi-speed transmission, wherein the rear-mounted gear sets are designed as Simpson gear sets.
Figures 3, 4:
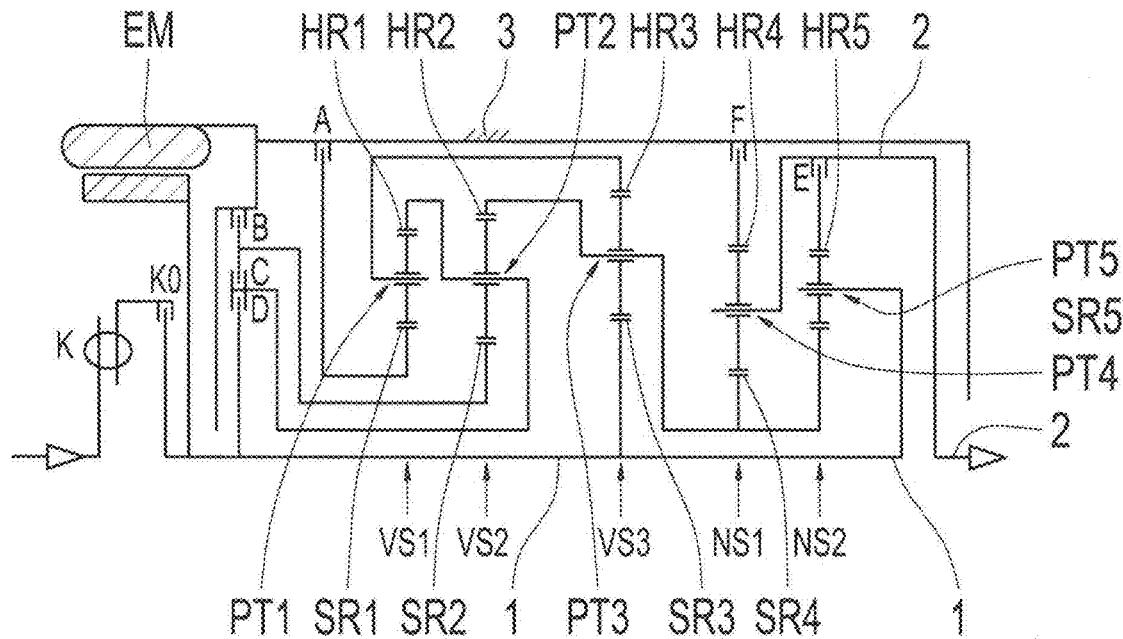
FIG. 3 shows a schematic view of a third embodiment of the multi-speed transmission according to the invention wherein the rear-mounted gear set is designed as a modified Simpson gear set.
FIG. 4 shows a shift diagram for the gear sets shown in FIGS. 1 to 3 by way of example.

In FIGS. 1 to 3, gear set diagrams of a multi-speed transmission of a vehicle having, for instance, 12 forward gears G1 to G12 and at least one reverse gear R are shown by way of example, wherein FIG. 4 shows a possible shift matrix or a possible shift diagram only as an example for the gear set diagrams.

The multi-speed transmission designed as an automatic transmission comprises a drive shaft 1 and an output shaft 2, wherein the drive shaft 1 can preferably be coupled to a drive motor of the vehicle, for instance an internal combustion engine or the like, via a torque converter 4 as shown by way of example in FIG. 1. In FIG. 2, the connection between the drive motor and the drive shaft 1 in the multi-speed transmission via a torsion damper K and a clutch K0 is indicated by way of example. In FIG. 3, the same coupling between the drive motor and the drive shaft 1 is implemented, wherein in this embodiment, an electric machine EM is additionally coupled to the drive shaft 1 to show a hybrid variant by way of example. The illustrated coupling options between the drive motor, an electric machine and the drive shaft 1 of the multi-speed transmission are merely exemplary and can be combined with each other in any way.

Independent of the respective embodiment variants, a first front-mounted gear set VS1, a second front-mounted gear set VS2 and a third front-mounted gear set VS3 and a first rear-mounted gear set NS1 and a second rear-mounted gear set NS2 are also provided in the multi-speed transmission, which are each designed as planetary gear sets. Moreover, only six shift elements A, B, C, D, E, F are provided, the selective engaging of which selectively implements a drive speed of the drive shaft 1 and speeds generated in the front-mounted gear sets VS1, VS2, VS3 for achieving at least twelve forward gears G1 to G12 and at least one reverse gear via at least one of the rear-mounted gear sets NS1, NS2 transmissible as the output speed to the output shaft 2.

The multi-speed transmission according to the invention provides that four shift elements A, B, C, D, are assigned to the front-mounted gear sets VS1, VS2, VS3, wherein two shift elements E, F are assigned to the two rear-mounted gear sets NS1, NS2, and wherein the front-mounted gear sets VS2 and VS3 are rigidly tied to an element of the rear-mounted gear sets NS1, NS2, such that six different output speeds of the front-mounted gear sets VS1, VS2, VS3 can be transmitted to at least one of the rear-mounted gear sets NS1, NS2. The output speeds of the front-mounted gear sets VS1, VS2, VS3 are normalized or correlated to the input speed of the drive shaft 1. One of the output speeds is smaller than 0. Three further output speeds are between 0 and 1. Another output speed is equal to 1 and another output speed is greater than 1.

At a value of 1, the output speed equals the drive speed. A front-mounted reduction gear set accordingly provides a normalized speed between 0 and 1. A front-mounted overdrive gear set accordingly provides a normalized speed greater than 1. A front-mounted reversing gear set accordingly provides a normalized speed smaller than 0.

Independent of the various embodiments, provision is made that a first shift element A is assigned as a brake, a second shift element B is assigned as a brake, a third shift element C is assigned as a clutch and a fourth shift element D is assigned as a clutch to the front-mounted gear sets VS1, VS2, VS3, and that a fifth shift element E is assigned as a clutch and a sixth shift element F is assigned as a brake to the rear-mounted gear sets NS1, NS2. Further, the front-mounted gear sets VS1, VS2, VS3 are designed as 3-carrier 5-shaft gears and the two rear-mounted gear sets NS1, NS2 are designed as 2-carrier 4-shaft gears.

In the first embodiment variant shown in FIG. 1, provision is made in detail that the drive shaft 1 is connected to a planetary gear carrier PT2 of the second front-mounted gear set VS2 and to a ring gear HR1 of the first front-mounted gear set VS1 when the fourth shift element D is engaged. In addition, the drive shaft having the ring gear HR1 and the planetary gear carrier PT2 can be connected both to a ring gear HR2 of the second front-mounted gear set VS2 and to a planetary gear carrier PT3 of the third front-mounted gear set VS3 when the third shift element C is engaged. Further, the drive shaft 1 is connected to a sun gear SR3 of the third front-mounted gear set VS3. Moreover, a sun gear SR1 of the first front-mounted gear set VS1 is connected to a housing 3 of the multi-speed transmission when the first shift element A is engaged. A sun gear SR2 of the second front-mounted gear set VS2 is connected to the housing 3 when the second shift element B is engaged. In addition, a planetary gear carrier PT1 of the first front-mounted gear set VS1 is connected to a ring gear HR3 of the third front-mounted gear set VS3. Further, the ring gear HR1 of the first front-mounted gear set VS1 is connected to the planetary gear carrier PT2 of the second front-mounted gear set VS2. Finally, the ring gear HR2 of the second front-mounted gear set VS2 is connected to the planetary gear carrier PT3 of the third front-mounted gear set VS3.

Further, provision is made in the first embodiment that the planetary gear carrier PT3 of the third front-mounted gear set VS3 is connected to a sun gear SR5 of the second rear-mounted gear set NS2. A sun gear SR4 of the first rear-mounted gear set NS1 is connected to the housing 3 when the sixth shift element F is engaged. Further, a planetary gear carrier PT4 of the first rear-mounted gear set NS1 is connected to a ring gear HR5 of the second rear-mounted gear set NS2 and to the output shaft 2. Further, a ring gear HR4 of the first rear-mounted gear set NS1 is connected to a planetary gear carrier PT5 of the second rear-mounted gear set NS2. When the fifth shift element E is engaged, the ring gear HR4 and the planetary gear carrier PT5 are connected to the drive shaft 1.

The exemplary embodiment shown by way of example in FIG. 1 thus shows the third shift element C, which is advantageously designed as a clutch having a large diameter located between the planetary gear carrier PT2 and the ring gear HR2 of the second front-mounted gear set VS2. Further, in the first embodiment variant, a 2-carrier 4-shaft gear arrangement advantageous in relation to planetary speeds designed as CR-CR is implemented as rear-mounted gear sets NS1, NS2.

FIG. 2 shows a second embodiment of the multi-speed transmission, in which the drive shaft 1 is connected to a planetary gear carrier PT2 of the second front-mounted gear set VS2 and a ring gear HR1 of the first front-mounted gear set VS1 when the fourth shift element D is engaged. The drive shaft 1 and the ring gear HR1 and the planetary gear carrier PT2 are also connected to a sun gear SR2 of the second gear set VS2 when the third shift element C is engaged. In addition, the drive shaft 1 is connected to a sun gear SR3 of the third front-mounted gear set VS3. Moreover, a sun gear SR1 of the first front-mounted gear set VS1 is connected to the housing 3 of the transmission when the first shift element A is engaged. A planetary gear carrier PT1 of the first front-mounted gear set VS1 is connected to a ring gear HR3 of the third front-mounted gear set VS3. The ring gear HR1 of the first front-mounted gear set VS1 is connected to the planetary gear carrier PT2 of the second front-mounted gear set VS2. Further, the sun gear SR2 of the second front-mounted gear set VS2 is connected to the housing 3 when the second shift element B is engaged. Furthermore, the ring gear HR2 of the second front-mounted gear set VS2 is connected to the planetary gear carrier PT3 of the third front-mounted gear set VS3.

Moreover, provision is made in the second embodiment shown in FIG. 2 that the planetary gear carrier PT3 of the third front-mounted gear set VS3 is connected to a sun gear SR4 of the first rear-mounted gear set NS1 and to a sun gear SR5 of the second rear-mounted gear set NS2. Further, a planetary gear carrier PT4 of the first rear-mounted gear set NS1 is connected to a ring gear HR5 of the second rear-mounted gear set NS2 and to the output shaft 2. A ring gear HR4 of the first rear-mounted gear set NS1 is connected to the housing 3 when the sixth shift element F is engaged. Further, a planetary gear carrier PT5 of the second rear-mounted gear set NS2 is connected to the drive shaft 1 when the fifth shift element E is engaged.

Accordingly, in the second embodiment variant shown in FIG. 2, a more favorable actuation of the third shift element C designed as a clutch, which couples the planetary gear carrier PT2 and the sun gear SR2 of the second front-mounted gear set VS2 to each other, results compared to the first embodiment. Further, the two rear-mounted gear sets NS1, NS2 are designed as a Simpson gear sets, resulting in significantly lower component stress.

FIG. 3 shows a third embodiment, in which the drive shaft 1 is connected to a sun gear SR3 of the third front-mounted gear set VS3. Further, the drive shaft 1 is connected to a planetary gear carrier PT2 of the second front-mounted gear set VS2 and to a ring gear HR1 of the first front-mounted gear set VS1 when the fourth shift element D is engaged. A sun gear SR1 of the first front-mounted gear set VS1 is connected to the housing 3 of the transmission when the first shift element A is engaged. Moreover, a planetary gear carrier PT1 of the first front-mounted gear set VS1 is connected to a ring gear HR3 of the third front-mounted gear set VS3. A ring gear HR2 of the second front-mounted gear set VS2 is connected to a planetary gear carrier PT3 of the third front-mounted gear set VS3. In addition, a sun gear SR2 of the second front-mounted gear set VS2 is connected to the housing 3 when the second shift element B is engaged, wherein the sun gear SR2 of the second front-mounted gear set VS2 is connected to the planetary gear carrier PT2 of the second front-mounted gear set VS2 and to the ring gear HR1 of the first front-mounted gear set VS1 when the third gear shift element C is engaged. When then the fourth shift element D is engaged, a connection to the drive shaft 1 can be implemented, too.

Moreover, provision is made in the third embodiment that the planetary gear carrier PT3 of the third front-mounted gear set VS3 is connected to both a sun gear SR4 of the first rear-mounted gear set NS1 and to a sun gear SR5 of the second rear-mounted gear set NS2. A planetary gear carrier PT4 of the first rear-mounted gear set NS1 is connected to the output shaft 2. Further, a ring gear HR5 of the second rear-mounted gear set NS2 is also connected to the output shaft 2 and to the planetary gear carrier PT4 of the first rear-mounted gear set NS1 when the fifth shift element E is engaged. In addition, a planetary gear carrier PT5 of the second rear-mounted gear set NS2 is connected to the drive shaft 1. Finally, a ring gear HR4 of the first rear-mounted gear set NS1 is connected to the housing 3 when the sixth shift element F is engaged.

Accordingly, in the third embodiment, a modified Simpson gear set is provided as a main gear set or as the rear-mounted gear sets NS1, NS2 in contrast to the second embodiment, wherein a lower support factor is implemented at the fifth shift element E designed as a clutch, in comparison to the first two embodiments.

A shift diagram of the gear set diagrams of the multi-speed transmission according to the invention as shown in FIGS. 1 to 3 is shown in FIG. 4 by way of example. The shift diagram indicates which shift elements A, B, C, D, E, F are engaged or closed to implement the individual gear stage. Further, the relevant ratio, efficiency and relevant gear increment are indicated in the shift diagram.

In the multi-speed transmission according to the invention, the first forward gear G1 is short geared, i.e. it has a high gear ratio and can thus be used as a creep mode. Further, the eighth forward gear G8 is designed as a direct gear. In addition, the twelfth forward G12 is a tall gear, i.e. it has a low gear ratio and can be used as a so-called overdrive gear.

Depending on the application, the multi-speed transmission can be designed having 12 forward gears G1 to G12 with normal gear steps and one reverse gear. It is also conceivable that, as mentioned above, 11 forward gears with normal gear steps, one creep mode and one reverse gear are provided. By omitting, for instance, the third highest gear, 11 speeds with optimized gear steps result. By omitting the third highest and the fifth highest gear, 10 speeds having optimized gear steps in the upper speeds can be implemented.

In detail, the shift diagram shown in FIG. 4 shows by way of example that the first shift element A, the second shift element B and the sixth shift element F are engaged to achieve a first forward gear G1. For achieving a second forward gear G2, the first shift element A, the third shift element C and the sixth shift element F are engaged. For achieving a third forward gear G3, the first shift element A, the fourth shift element D and the sixth shift element F are engaged. For achieving a fourth forward gear G4, the third shift element C, the fourth shift element D and the sixth shift element F are engaged. For achieving a fifth forward gear G5, the second shift element B, the fourth shift element D and the sixth shift element F are engaged. For achieving a sixth forward gear G6, the second shift element B, the fifth shift element E and the sixth shift element F are engaged. For achieving a seventh forward gear G7, the second shift element B, the fourth shift element D and the fifth shift element E are engaged. For achieving an eighth forward gear G8, the third shift element C, the fourth shift element D and the fifth shift element E are engaged. For achieving a ninth forward gear G9, the first shift element A, the fourth shift element D and the fifth shift element E are engaged. For achieving a tenth forward gear G10, the first shift element A, the third shift element C and the fifth shift element E are engaged. For achieving an eleventh forward gear G 11, the first shift element A, the second shift element B and the fifth shift element E are engaged. For achieving a twelfth forward gear G12, the second shift element B, the third shift element C and the fifth shift element E are engaged.

For achieving a first alternative of the sixth forward gear G6, the first shift element A, the fifth shift element E and the sixth shift element F are engaged. For achieving a second alternative of the sixth forward gear G6, the third shift element C, the fifth shift element E and the sixth shift element F are engaged. Finally, for achieving a third alternative of the sixth forward gear G6, the fourth shift element D, the fifth shift element E and the sixth shift element F are engaged.

Thus, three of the shift elements A, B, C, D, E, F are engaged for achieving any gear.

At idle or in neutral N, preferably the second shift element B and the sixth shift element F are engaged. This results in the advantage that only one further shift element must be engaged to achieve the reverse gear R or a forward gear.

REFERENCE NUMERALS 1 drive shaft
2 output shaft
3 housing
4 torque converter
EM electric machine
K torsion damper
K0 clutch between electric machine and drive machine
VS1 first front-mounted gear set
VS2 second front-mounted gear set
VS3 third front-mounted gear set
NS1 first rear-mounted gear set
NS2 second rear-mounted gear set
G1 first forward gear
G2 second forward gear
G3 third forward gear
G4 fourth forward gear
G5 fifth forward gear
G6 sixth forward gear
G7 seventh forward gear
G8 eighth forward gear
G9 ninth forward gear
G10 tenth forward gear
G11 eleventh forward gear
G12 twelfth forward gear
R reverse gear
N Neutral or idle
A first shift element as a brake
B second shift element as a brake
C third shift element as a clutch
D fourth shift element as a clutch
E fifth shift element as a clutch
F sixth shift element as a brake
SR1 sun gear of the first front-mounted gear set
PT1 planetary gear carrier of the first front-mounted gear set
HR1 ring gear of the first front-mounted gear set
SR2 sun gear of the second front-mounted gear set
PT2 planetary gear carrier of the second front-mounted gear set
HR2 ring gear of the second front-mounted gear set
SR3 sun gear of the third front-mounted gear set
PT3 planetary gear carrier of the third front-mounted gear set
HR3 ring gear of the third front-mounted gear set
SR4 sun gear of the first rear-mounted gear set
PT4 planetary carrier of the first rear-mounted gear set
HR4 ring gear of the first rear-mounted gear set
SR5 sun gear of the second rear-mounted gear set
PT5 planetary carrier of the second rear-mounted gear set
HR5 ring gear of the second rear-mounted gear set

The invention claimed is:

1. A multi-speed transmission comprising:
   a drive shaft;
   an output shaft;
   a housing;
   a first front-mounted gear set, a second front-mounted gear set, a third front-mounted gear set, a first rear-mounted gear set and a second rear-mounted gear set, and each of the first, the second and the third front-mounted gear sets and the first and the second rear-mounted gear sets being a planetary gear set comprising a ring gear, a planetary gear carrier supporting at least one planetary gear and a sun gear;
   first, second, third, fourth, fifth and sixth shift elements, selective engagement of the first, the second, the third, the fourth, the fifth and the sixth shift elements renders a drive speed of the drive shaft and speeds generated in the first, the second and the third front-mounted gear sets for achieving at least twelve forward gears and at least one reverse gear (R) via at least one of the first and the second rear-mounted gear sets which are transmissible as an output speed to the output shaft;
   the first, the second, the third and the fourth shift elements being assigned to the first, the second and the third front-mounted gear sets, and the fifth and the sixth shift elements being assigned to the first and the second rear-mounted gear sets;
   at least one of the first, the second and the third front-mounted gear sets being rigidly fixed to an element of the first and the second rear-mounted gear sets, resulting in six different front-mounted gear set output speeds of the first, the second and the third front-mounted gear sets being transmissible to at least one of the first and the second rear-mounted gear sets, and if normalized to the input speed of the drive shaft (1), one of the six different front-mounted gear set output speeds is smaller than 0, three of the six different front-mounted gear set output speeds are between 0 and 1, one of the six different front-mounted gear set output speeds is equal to 1, and one of the six different front-mounted gear set output speeds is greater than 1, and the drive shaft is connectable to the planetary gear carrier of the second front-mounted gear set and to the ring gear of the first front-mounted gear set by engagement of the fourth shift element.

2. The multi-speed transmission according to claim 1, wherein
   the first and the second shift elements are brakes, and the third and the fourth shift elements are clutches, and
   the fifth shift element is a clutch, and the sixth shift element is a brake.

3. The multi-speed transmission according to claim 1, wherein the first rear-mounted gear set and the second rear-mounted gear set are designed as 2-carrier 4-shaft gears.

4. The multi-speed transmission according to claim 1, wherein
   , the ring gear of the first front-mounted gear set and the planetary gear carrier of the second front-mounted gear set are connectable to the sun gear of the second front-mounted gear set by engagement of the third shift element;
   the drive shaft is connected the sun gear of the third front-mounted gear set;
   the sun gear of the first front-mounted gear set is connectable to the housing of the transmission by engagement of the first shift element;
   the planetary gear carrier of the first gear set is connected to the ring gear of the third front-mounted gear set;
   the sun gear of the second front-mounted gear set is connectable to the housing by engagement of the second shift element; and
   the ring gear of the second front-mounted gear set is connected to the planetary gear carrier of the third front-mounted gear set.

5. The multi-speed transmission according to claim 4, wherein the planetary gear carrier of the third front-mounted gear set is connected to the sun gear of the first rear-mounted gear set and to the sun gear of the second rear-mounted gear set;

the planetary gear carrier of the first rear-mounted gear set is connected to the ring gear of the second rear-mounted gear set and to the output shaft;

the ring gear of the first rear-mounted gear set is connectable to the housing of the transmission by engagement of the sixth shift element; and the planetary gear carrier of the second rear-mounted gear set is connectable to the drive shaft by engagement of the fifth shift element.

6. The multi-speed transmission according to claim 4, wherein the planetary gear carrier of the third front-mounted gear set is connected to the sun gear of the first rear-mounted gear set and to the sun gear of the second rear-mounted gear set;

the planetary gear carrier of the first rear-mounted gear set is connected to the output shaft;

the ring gear of the second rear-mounted gear set is connectable to the output shaft and to the planetary gear carrier of the first rear-mounted gear set by engagement of the fifth shift element;

the ring gear of the first rear-mounted gear set is connectable to the housing of the transmission by engagement of the sixth shift element; and the planetary gear carrier of second rear-mounted gear set is connected to the drive shaft.

7. A multi-speed transmission comprising:

a drive shaft;

an output shaft;

a housing;

a first front-mounted gear set, a second front-mounted gear set, a third front-mounted gear set, a first rear-mounted gear set and a second rear-mounted gear set, and each of the first, the second and the third front-mounted gear sets and the first and the second rear-mounted gear sets being a planetary gear set comprising a ring gear, a planetary gear carrier supporting at least one planetary gear and a sun gear;

first, second, third, fourth, fifth and sixth shift elements, selective engagement of the first, the second, the third, the fourth, the fifth and the sixth shift elements renders a drive speed of the drive shaft and speeds generated in the first, the second and the third front-mounted gear sets for achieving at least twelve forward gears and at least one reverse gear (R) via at least one of the first and the second rear-mounted gear sets which are transmissible as an output speed to the output shaft;

the first, the second, the third and the fourth shift elements being assigned to the first, the second and the third front-mounted gear sets, and the fifth and the sixth shift elements being assigned to the first and the second rear-mounted gear sets;

at least one of the first, the second and the third front-mounted gear sets being rigidly fixed to an element of the first and the second rear-mounted gear sets, resulting in six different front-mounted gear set output speeds of the first, the second and the third front-mounted gear sets being transmissible to at least one of the first and the second rear-mounted gear sets, and if normalized to the input speed of the drive shaft, one of the six different front-mounted gear set output speeds is smaller than 0, three of the six different front-mounted gear set output speeds are between 0 and 1, one of the six different front-mounted gear set output speeds is equal to 1, and one of the six different front-mounted gear set output speeds is greater than 1;

the drive shaft is connectable to the planetary gear carrier of the second front-mounted gear set and to the ring gear of the first front-mounted gear set by engagement of the fourth shift element;

the planetary gear carrier of the second front-mounted gear set and the ring gear of the first front-mounted gear set are connectable to the ring gear of the second front-mounted gear set and to the planetary gear carrier of the third front-mounted gear set by engagement of the third shift element;

the drive shaft is connected to the sun gear of the third front-mounted gear set;

the sun gear of the first front-mounted gear set is connectable to the housing of the transmission by engagement of the first shift element;

the sun gear of the second front-mounted gear set is connectable to the housing of the transmission by engagement of the second shift element; and the planetary gear carrier of the first front-mounted gear set is connected to the ring gear of the third front-mounted gear set.

8. The multi-speed transmission according to claim 7, wherein the planetary gear carrier of the third front-mounted gear set is connected to the sun gear of the second rear-mounted gear set;

the sun gear of the first rear-mounted gear set is connectable to the housing by engagement of the sixth shift element;

the planetary gear carrier of the first rear-mounted gear set is connected to the ring gear of the second rear-mounted gear set and to the output shaft;

the ring gear of the first rear-mounted gear set is connected to the planetary gear carrier of the second rear-mounted gear set; and the drive shaft is connectable to the ring gear of the first rear-mounted gear set and the planetary gear carrier of the second rear-mounted gear set by engagement of the fifth shift element.

9. A multi-speed transmission comprising:

a drive shaft;

an output shaft;

a housing;

a first front-mounted gear set, a second front-mounted gear set, a third front-mounted gear set, a first rear-mounted gear set and a second rear-mounted gear set, and each of the first, the second and the third front-mounted gear sets and the first and the second rear-mounted gear sets being a planetary gear set comprising a ring gear, a planetary gear carrier supporting at least one planetary gear and a sun gear;

first, second, third, fourth, fifth and sixth shift elements, selective engagement of the first, the second, the third, the fourth, the fifth and the sixth shift elements renders a drive speed of the drive shaft and speeds generated in the first, the second and the third front-mounted gear sets for achieving at least twelve forward gears and at least one reverse gear via at least one of the first and the second rear-mounted gear sets which are transmissible as an output speed to the output shaft;

the first, the second, the third and the fourth shift elements being assigned to the first, the second and the third front-mounted gear sets, and the fifth and the sixth shift elements being assigned to the first and the second rear-mounted gear sets;

at least one of the first, the second and the third front-mounted gear sets being rigidly fixed to an element of the first and the second rear-mounted gear sets, resulting in six different front-mounted gear set output speeds of the first, the second and the third front-mounted gear sets being transmissible to at least one of the first and the second rear-mounted gear sets, and if normalized to the input speed of the drive shaft, one of the six different front-mounted gear set output speeds is smaller than 0, three of the six different front-mounted gear set output speeds are between 0 and 1, one of the six different front-mounted gear set output speeds is equal to 1, and one of the six different front-mounted gear set output speeds is greater than 1;

a reverse gear is implemented by engagement of the second shift element, the third shift element and the sixth shift element;

a first forward gear is implemented by engagement of the first shift element, the second shift element and the sixth shift element;

a second forward gear is implemented by engagement of the first shift element, the third shift element and the sixth shift element;

a third forward gear is implemented by engagement of the first shift element, the fourth shift element and the sixth shift element;

a fourth forward gear is implemented by engagement of the third shift element, the fourth shift element and the sixth shift element;

a fifth forward gear is implemented by engagement of the second shift element, the fourth shift element and the sixth shift element;

a sixth forward gear is implementable by engagement of the second shift element, the fifth shift element and the sixth shift element;

a seventh forward gear is implementable by engagement of the second shift element, the fourth shift element and the fifth shift element;

an eighth forward gear is implemented by engagement of the third shift element, the fourth shift element and the fifth shift element;

a ninth forward gear is implemented by engagement of the first shift element, the fourth shift element and the fifth shift element;

a tenth forward gear is implemented by engagement of the first shift element, the third shift element and the fifth shift element an eleventh forward gear is implemented by engagement of the first shift element, the second shift element and the fifth shift element; and a twelfth forward gear is implemented by engagement of the second shift element, the third shift element and the fifth shift element.

10. The multi-speed transmission according to claim 9, wherein the sixth forward gear is implemented by engagement of the first shift element, the fifth shift element and the sixth shift element.

11. The multi-speed transmission according to claim 9, wherein the sixth forward gear is implemented by engagement of the third shift element, the fifth shift element and the sixth shift element.

12. The multi-speed transmission according to claim 9, wherein the sixth forward gear is implemented by engagement of the fourth shift element, the fifth shift element and the sixth shift element are engaged.

* * * * *